(12) United States Patent
Ruhnow

(10) Patent No.: US 7,092,407 B2
(45) Date of Patent: Aug. 15, 2006

(54) SYNCHRONIZATION OF AN INSTRUMENT'S TIME-BASE CLOCK AND NOTABLE EVENTS UTILIZING UNUSED SIGNAL PAIRS ON A DAISY-CHAINED ETHERNET COMMUNICATION LINK

(75) Inventor: Roger William Ruhnow, Monument, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 672 days.

(21) Appl. No.: 10/152,456

(22) Filed: May 21, 2002

(65) Prior Publication Data

US 2004/0225739 A1 Nov. 11, 2004

(51) Int. Cl.
*H04J 3/06* (2006.01)
*G06F 15/173* (2006.01)

(52) U.S. Cl. .................. 370/503; 709/223; 709/224

(58) Field of Classification Search ............... 709/223, 709/224; 370/503
See application file for complete search history.

(56) References Cited

U.S. PATENT DOCUMENTS

| 4,853,613 | A  | * | 8/1989 | Sequeira et al. | 324/601 |
| 5,535,193 | A  | * | 7/1996 | Zhang et al. | 370/253 |
| 5,747,893 | A  | * | 5/1998 | Bennett et al. | 307/100 |
| 5,923,663 | A  | * | 7/1999 | Bontemps et al. | 370/445 |
| 6,577,605 | B1 | * | 6/2003 | Dagate et al. | 370/270 |
| 6,735,629 | B1 | * | 5/2004 | Cafarelli et al. | 709/224 |
| 2002/0187749 | A1 | * | 12/2002 | Beasley et al. | 455/41 |
| 2003/0018927 | A1 | * | 1/2003 | Gadir et al. | 714/4 |
| 2003/0061340 | A1 | * | 3/2003 | Sun et al. | 709/224 |

* cited by examiner

*Primary Examiner*—John Follansbee
*Assistant Examiner*—Joshua Joo

(57) ABSTRACT

An apparatus including two distributed network analyzers (each, a "DNA") and Ethernet cabling to connect the DNAs. Each DNA performs time correlation with the other through the Ethernet cabling.

20 Claims, 5 Drawing Sheets

SYNCHRONIZATION OF AN INSTRUMENT'S TIME-BASE CLOCK AND NOTABLE EVENTS UTILIZING UNUSED SIGNAL PAIRS ON A DAISY-CHAINED ETHERNET COMMUNICATION LINK

BACKGROUND OF THE INVENTION

1. Field of the Invention

The present invention relates to Ethernet communication links. More particularly, the present invention relates to synchronization of an instrument's time-base clock and notable events using unused signal pairs on a daisy-chained Ethernet communication link.

2. Description of the Related Art

Directly-connected network instruments, e.g., protocol analyzers or distributed network analyzers, often need to share time correlation, sample interval correlation, and event broadcasts. It is not feasible for each instrument to estimate and create its own clock and heartbeat signal, because it is possible that too great of a difference will result. A solution is needed that eliminates the need for additional connections between the instruments to carry time and sample interval correlation and event broadcasts.

SUMMARY OF THE INVENTION

Accordingly, the present invention eliminates the need for additional cable connections between connected instruments in a network. More specifically, the present invention provides a way to share time correlation, sample interval correlation, and event broadcasts between network instruments that are directly daisy-chain connected via Ethernet cabling, using two unused twisted wire pairs of the Ethernet cabling. Additional advantages of the invention will be set forth in part in the description that follows, and in part, will be obvious from the description, or may be learned by practicing the invention disclosed herein.

The present invention provides an apparatus that includes two distributed network analyzers (each, a "DNA") and Ethernet cabling to connect the DNAs. Each DNA performs time correlation with the other through the Ethernet cabling.

The present invention provides an apparatus that includes a plurality of DNAs and Ethernet cabling to daisy-chain connect the DNAs. The Ethernet cabling includes four twisted pairs of wires. The plurality of DNAs perform time correlation, sample interval correlation, and event broadcasts with one another through the Ethernet cabling.

The present invention provides an apparatus that includes a plurality of DNAs and Ethernet connecting means to daisy-chain connect the DNAs. The Ethernet connecting means includes four twisted pairs of wires. The plurality of DNAs perform time correlation, sample interval correlation, and event broadcasts with one another through the Ethernet connecting means.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
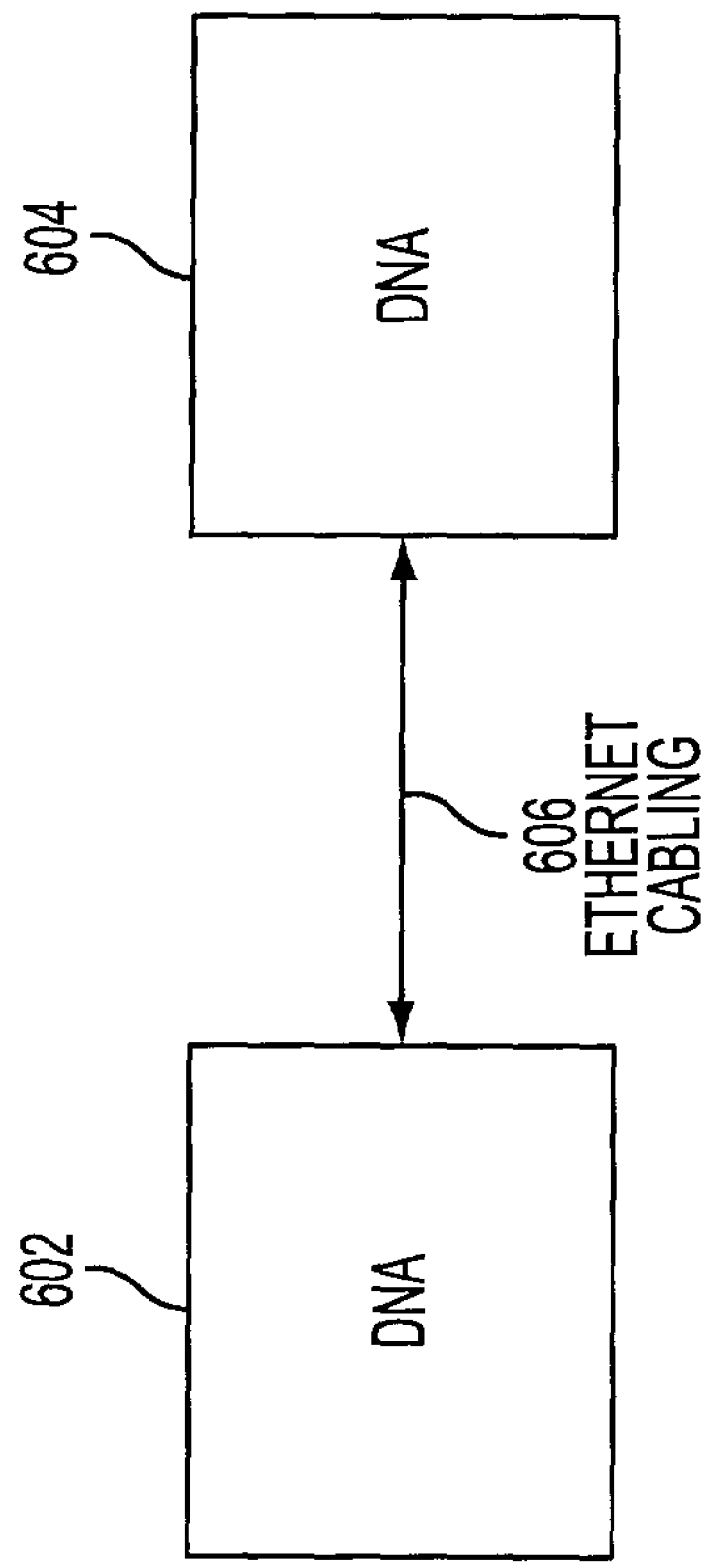
FIG. 1 is a diagram illustrating distributed network analyzers connected together by Ethernet cabling, according to embodiments of the present invention.

Reference will now be made in detail to the present preferred embodiments of the present invention, examples of which are illustrated in the accompanying drawings, wherein like reference numerals refer to like elements throughout.

Time correlation is a common clock signal shared among each of the connected instruments. Sample interval correlation is a common heartbeat signal shared among each of the connected instruments, and is often used to signal a common start. For instance, each instrument in a daisy-chained network of instruments may require the same clock for time stamping and heartbeat to determine the interval over which statistical counters are taken and may need the ability to broadcast an event to the other instruments. For example, when one instrument discovers a condition, it may need to stop capturing data and communicate the condition to the other instruments so that they may all stop capturing data.

If these instruments are connected together via Ethernet cabling, several of the pairs of twisted wires that are contained within the Ethernet cabling go unused, because 10BASE-T and 100BASE-TX only require two twisted pairs of wires. The present invention eliminates the need for network administrators to add additional connections between the instruments to carry the time correlation and event broadcasts.

FIG. 1 is a diagram illustrating distributed network analyzers connected together by Ethernet cabling, according to embodiments of the present invention. Referring now to FIG. 1, distributed network analyzers (each, a "DNA") 602 and 604 are connected via Ethernet cabling 606 (see FIG. 4 and the accompanying explanatory text herein for a more detailed description of Ethernet cabling 606). In an embodiment, DNAs 602 and 604 are daisy-chain connected. Ethernet cabling 606 comprises segments of Ethernet cables, where one Ethernet cable segment is used to connect two components of the system. For example, each Ethernet cable terminates with, for example, a male RJ-45 connector, and each instrument connected via Ethernet cabling 606 receives the Ethernet cable with, for example, a female RJ-45 connector (see FIG. 5 and the accompanying explanatory text herein for a more detailed description of Ethernet cabling 606). Embodiments of the present invention are not limited to that shown in FIG. 1. For example, there may be more than two daisy-chained DNAs in the system, i.e., a plurality of DNAs. Embodiments of the present invention are not limited to Ethernet cabling, as any connection medium containing at least four twisted pairs of wires may be used.

DNAs 602 and 604 share time correlation, sample interval correlation, and event broadcasts through Ethernet cabling

606. In an embodiment, each DNA is capable of bi-directional receipt and transmission (see FIG. 5 and the accompanying explanatory text herein for a more detailed description of each DNA). Embodiments of the present invention are not limited to daisy-chained DNAs. For example, other daisy-chained network instruments may be used.

Figure 2:
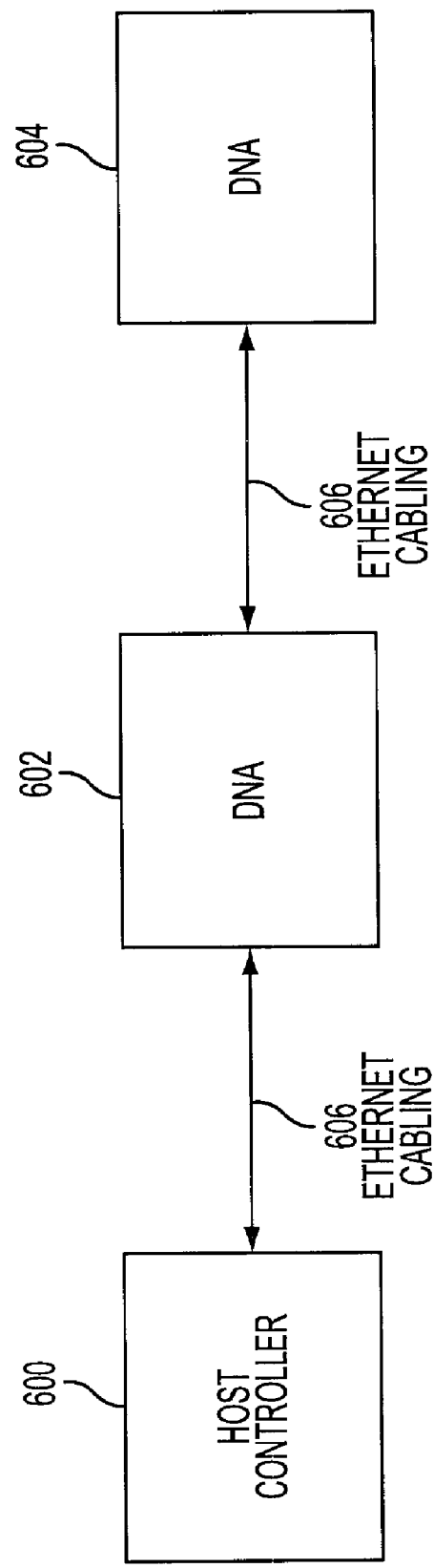
FIG. 2 is a diagram illustrating a host controller and distributed network analyzers connected together by Ethernet cabling, according to embodiments of the present invention.

FIG. 2 is a diagram illustrating a host controller and distributed network analyzers connected together by Ethernet cabling, according to embodiments of the present invention. Referring now to FIG. 2, host controller 600 is connected to DNA 602, which is connected to DNA 604. All of the connections are via Ethernet cabling 606, and are in a daisy-chain configuration beginning with host controller 600 and ending with DNA 604. Embodiments of the present invention are not limited to that shown in FIG. 2. For example, there may be more than two daisy-chained DNAs in the system, i.e., a plurality of DNAs. Embodiments of the present invention are not limited to Ethernet cabling, as any connection medium containing at least four twisted pairs of wires may be used.

Host controller 600 and DNAs 602 and 604 share time correlation, sample interval correlation, and event broadcasts through Ethernet cabling 606. In an embodiment, each DNA is capable of bi-directional receipt and transmission (see FIG. 5 and the accompanying explanatory text herein for a more detailed description of each DNA). In an embodiment, host controller 600 is a personal computer ("PC"). However, embodiments of the present invention are not limited to host controller 600 being a PC. For example, host controller 600 may be any type of client server or terminal. Host controller 600 launches applications to be run, and DNAs 602 and 604 run the applications and send data back to host controller 600. Embodiments of the present invention are not limited to daisy-chained DNAs. For example, other daisy-chained network instruments may be used.

Figure 3:
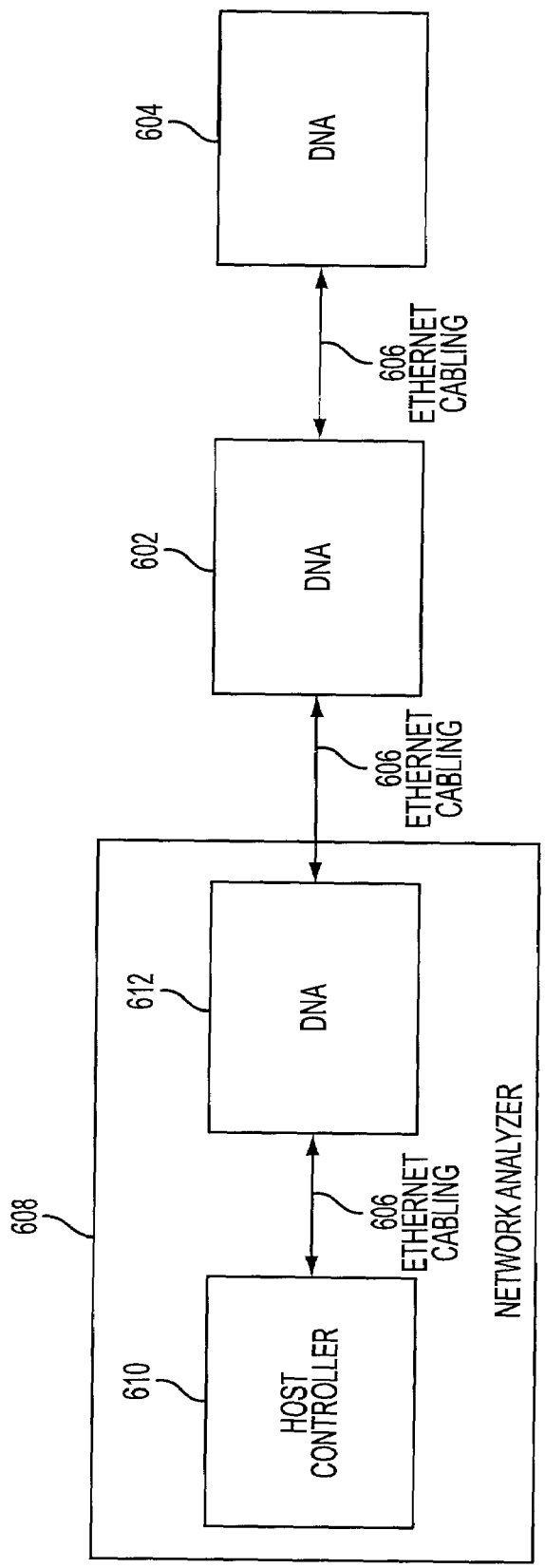
FIG. 3 is a diagram illustrating a network analyzer and distributed network analyzers connected together by Ethernet cabling, according to embodiments of the present invention.

FIG. 3 is a diagram illustrating a network analyzer and distributed network analyzers connected together by Ethernet cabling, according to embodiments of the present invention. Referring now to FIG. 3, DNAs 602 and 604 are daisy-chain connected to network analyzer 608 via Ethernet cabling 606. One Ethernet cable is used to connect two components of the system. However, embodiments of the present invention are not so limited, as there may be more than two daisy-chained DNAs in the system, i.e., a plurality of DNAs. Embodiments of the present invention are not limited to Ethernet cabling, as any connection medium containing four twisted pairs of wires may be used.

Network analyzer 608 comprises host controller 610 and DNA 612, which are connected, for example, via a portion of Ethernet cabling 606. Host Controller 610 and DNAs 612, 602, and 604 share, for example, time correlation, sample interval correlation, and event broadcasts through Ethernet cabling 606. In an embodiment, each DNA is capable of bi-directional receipt and transmission (see FIG. 5 and the accompanying explanatory text herein for a more detailed description of each DNA). Host controller 610 launches applications to be run, and DNAs 612, 602, and 604 run the applications and send data back to host controller 600. Network analyzer 608 offers the advantage of having a host controller and DNA packaged together at the start of the daisy-chain. In an embodiment, network analyzer 608 only has, for example, an external Ethernet-out connector (contained in DNA 612) and can therefore, for example, be used at the beginning of the daisy-chain. In an embodiment, host controller 610 is a PC. However, embodiments of the present invention are not so limited, as host controller 610 may be any type of client server. Embodiments of the present invention are not limited to daisy-chained DNAs. For example, other daisy-chained network instruments may be used, in which case DNA 612 would also be replaced with the different type of network instrument.

Figure 4:
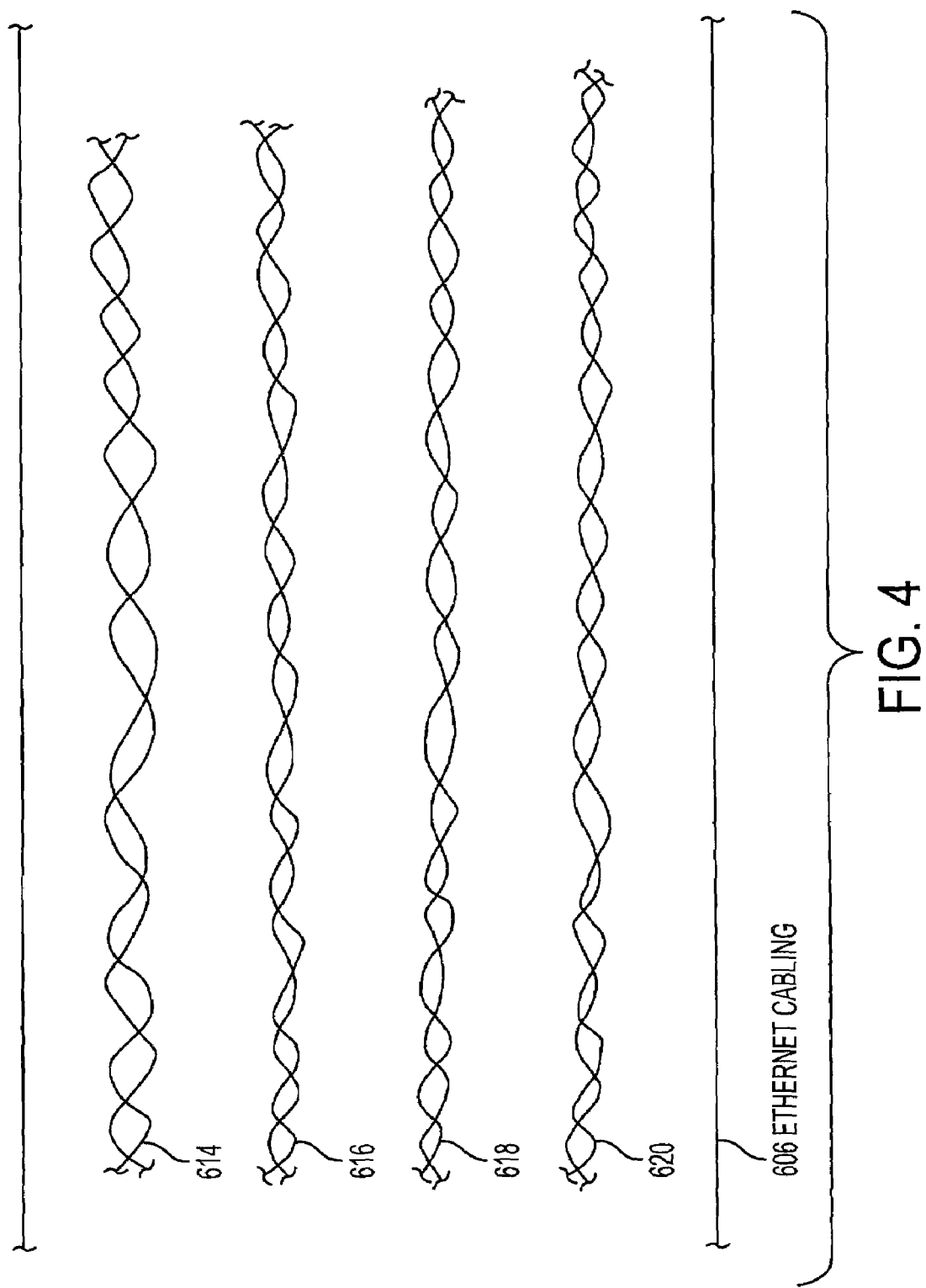
FIG. 4 is a diagram illustrating the contents of Ethernet cabling, according to embodiments of the present invention.

FIG. 4 is a diagram illustrating the contents of Ethernet cabling, according to embodiments of the present invention. Referring now to FIG. 4, Ethernet cabling 606 comprises, for example, four twisted pairs of wires 614, 616, 618, and 620. Each twisted wire pair is a pair of wires twisted about one another. Using twisted wire pairs helps eliminate signal interference between wire pairs in the cabling. Embodiments of the present invention are not limited to four twisted pairs of wires. For example, a different number of twisted pairs may be present, or a non-twisted pair configuration may be used.

The present invention has the advantage of requiring only one segment of Ethernet cable between DNAs. Therefore, the need for additional cables to transmit time and sample interval correlation and event broadcasts is eliminated. Existing Ethernet cable segments may be used. This reduces user confusion, cable cluttering, and instances of incorrect wiring. In addition, readily available and inexpensive Ethernet cables can still be used to connect the DNAs.

In the present invention, as an example, two twisted wire pairs are used to transmit Ethernet data, a third twisted wire pair is used to transmit time correlation and sample interval correlation, and a fourth twisted wire pair is used to transmit event broadcasts. In an embodiment, the Ethernet data is 10BASE-T or 100BASE-TX format. In an embodiment, host controllers 600 or 610 and DNAs 602, 604, or 612 exchange Ethernet data via the two twisted wire pairs allocated to Ethernet data transmissions. Examples of Ethernet data include configuration, control, and status information. In an embodiment, the time correlation is a 10 MHz clock that is carried as a 5V differential square wave; however, embodiments of the present invention are not so limited, as a different clock speed may be used. In an embodiment, the sample interval correlation is a 100 ms heartbeat that is created by driving one clock period with a 75/25 duty cycle every 1 million clock cycles; however, embodiments of the present invention are not so limited, as a different heartbeat period may be used. In an embodiment, each twisted wire pair is a 100 ohm differential signal. In an embodiment, event broadcasts are in time division multiplexed ("TDM") format. Each multiplexed interval represents a different event. The multiplexing intervals are synchronized to the heartbeat. In this manner, every DNA in the daisy-chain establishes identical multiplexing intervals. However, embodiments of the present invention are not limited to TDM format.

Figure 5:
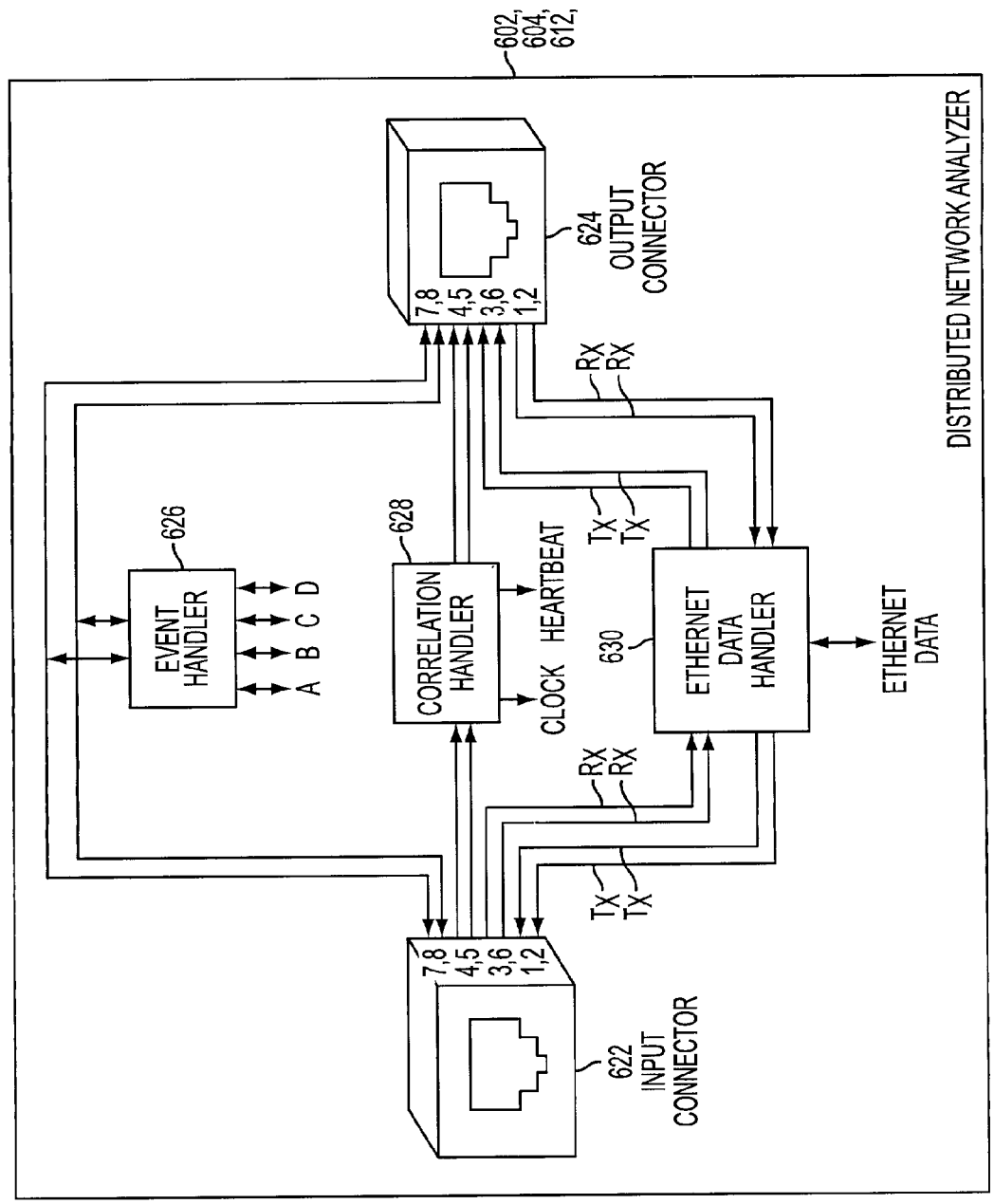
FIG. 5 is a diagram illustrating the contents of a distributed network analyzer, according to embodiments of the present invention.

FIG. 5 is a diagram illustrating the contents of a DNA, according to embodiments of the present invention. Referring now to FIG. 5, DNA 602, 604, or 612 comprises input connector 622, output connector 624, event handler 626, correlation handler 628, and Ethernet data handler 630. In an embodiment, input connector 622 and output connector 624 are female RJ-45 connectors and are each equipped to send and receive Ethernet transmissions via Ethernet cabling 606 (not shown).

In an embodiment, output connector 624 is equipped with a crossover wiring capability, i.e., MDI-X (not illustrated), which allows Ethernet cabling 606 to be uniform throughout its cable segments (where input connector 622 is wired as MDI). Specifically, the pin number designations on a particular segment of Ethernet cabling 606 are the same at both ends thereof, i.e., pin 1 on one end is pin 1 on the other end, pin 2 on one end is pin 2 on the other end, etc. This allows the DNA to receive and transmit from each connector without requiring Ethernet cabling that has crossed-over wiring; thereby increasing network design flexibility. The four twisted wire pairs 614—620 correspond to the numbered lines 1,2, 3,6, 4,5, and 7,8 on each of the connectors. The MDI specification section of the IEEE 802.3 Ethernet standard, 2000 edition, 10BASE-T and 100BASE-TX dictates the cable pairings for pins 1,2 and 3,6. Ethernet cable manufacturers also pair pins 4,5 and 7,8 so that their cables can universally support most Ethernet MDI specifications, which use all four pairs, such as 100BASE-T4 and 1000BASE-T.

In an embodiment, Ethernet data handler 630 is an Ethernet switch. Ethernet data handler 630 is connected to line pairs 1,2 and 3,6, but is not limited thereto, as it may be connected to any two line pairs. Ethernet data handler 630 receives Ethernet data on the lines designated as "Rx" and transmits Ethernet data on the lines designated as "Tx." Ethernet data handler 630 receives and extracts Ethernet data from host controllers 600 or 610 and the other connected DNAs, generates Ethernet data, and transmits Ethernet data to host controllers 600 or 610 via the other connected DNAs if necessary.

Correlation handler 628 is connected to line pair 4,5, but is not limited thereto, as it may be connected to any line pair that is not being used for Ethernet data. Correlation handler 628 can receive, generate, and transmit time and sample interval correlation. If time and sample interval correlation are received by correlation handler 628, it extracts a clock and heartbeat therefrom for use internal to the DNA, and transmits the time and sample interval correlation to the next DNA, if one is connected thereto. If time and sample interval correlation are not received by correlation handler 628, e.g., if the DNA is the first DNA in the daisy-chain, it generates a clock and heartbeat to be used internally to the DNA, and then encodes and transmits the clock and heartbeat to the next DNA, if one is connected. This way, each daisy-chain connected DNA has the same clock and heartbeat. To generate a clock when needed, clock handler 628 can use a reference clock from a GPS receiver, a local oscillator, or a clock derived from the network under test conditions. However, embodiments of the present invention are not so limited, as other methods of generating a clock my be used.

Event handler 626 is bi-directionally connected to line pair 7,8, but is not limited thereto, as it may be connected to any line pair that is not being used for Ethernet data. The line pair being used for event broadcasts is a party line, and propagates in both directions. Using the encoded heartbeat as a reference, the event broadcast line pair is time division multiplexed to carry four signals of events, illustrated by lines A, B, C, and D. However, embodiments of the present invention are not so limited, as there may be a different number of events or no events at all. Each event has a 16 clock window; therefore, the four events take 64 clocks to encode onto the event line. When the event line is driven, it is driven to a 5V differential signal for one clock period, i.e., 100 ns, and then released. Event handler 626 can bi-directionally receive, generate, and transmit event broadcasts. Examples of events include group run, group stop, and restart time stamps. Event handler 626 can receive event broadcasts from host controller 600 or 610 if one is connected to the DNA or from another DNA. Upon receipt of an event broadcast that is passed through the DNA on the event lines, event handler 626 extracts the event for use internal to the DNA. If the DNA detects an event to be broadcast where no broadcast regarding that event was received, event handler 626 generates an event broadcast and transmits the event broadcast to each instrument to Which it is connected.

If one DNA wants to broadcast a particular event to the other DNAs in the daisy-chain, it waits for the appropriate multiplexing window before placing the event indication on the event line. Other DNAs in the daisy-chain interpret the event based on the multiplexing window that was active when the event was received. Allowances must be made in the actual window size within a multiplexed interval to provide for clock skewing and signal propagation delays.

If a DNA is first or last in the daisy-chain, it should, for example, terminate the event lines using, for example, 100 ohms. In such an instance, output connector 624 terminates the event lines accordingly. A DNA in the middle of a daisy-chain will not usually terminate the event lines, because the event lines are intended to be party lines. However, in an embodiment, a DNA in the middle of the daisy-chain may be set up to break the event line by electrically isolating the event pair on the input connector from the event pair on the output connector and terminating the event pairs.

In a daisy-chained system, the output connector of one DNA is connected to the input connector of the next DNA. The last DNA in the daisy-chain does not have anything connected to its output connector. When connected to a host controller, the first DNA in the daisy-chain is connected thereto via the DNA's input connector.

The present invention has been described with respect to distributed network analyzers. However, embodiments of the present invention are not limited thereto, as other network instruments may be used. The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   first and second distributed network analyzers; and
   Ethernet cabling, having unused pairs of wiring, connecting the first and second distributed network analyzers together,
   wherein the first and second distributed network analyzers perform time correlation with each other by transmitting both a common clock signal and a sample interval correlation signal that is synced to the common clock signal through a first pair of said unused pairs of wiring from the first distributed network analyzer to the second distributed network analyzers through the Ethernet cabling, and
   the first and second distributed network analyzers broadcast events propagating in both directions with each other by sending events over a second pair of said unused pairs of wiring, wherein the events are time division multiplexed based upon a heartbeat signal encoded into the common clock signal.

2. The apparatus of claim 1, wherein the first and second distributed network analyzers perform event broadcasting with each other using an event handler that bi-directionally receives, generates, and transmits event broadcasts.

3. The apparatus of claim 1, further comprising a host controller coupled with the first distributed network analyzer via the Ethernet cabling, the host controller and the first and second distributed network analyzers exchanging Ethernet data via the Ethernet cabling.

4. The apparatus of claim 1, further comprising a network analyzer coupled with the first distributed network analyzer via the Ethernet cabling, the network analyzer and first and second distributed network analyzers exchanging Ethernet data via the Ethernet cabling.

5. An apparatus comprising:
a plurality of distributed network analyzers; and
Ethernet cabling, daisy-chain connecting the distributed network analyzers, the Ethernet cabling having using unused pairs of wires, wherein
the plurality of distributed network analyzers are connected to one another through the Ethernet cabling to perform time correlation using a first pair of said unused pairs of wires to transmit both a common clock signal and a sample interval correlation signal that is synced to the common clock signal and shared among each of the connected plurality of distributed network analyzers,
the distributed network analyzers use a second pair of said unused pairs of wires to transmit an event broadcast signal from any of the plurality of distributed network analyzers,
the event broadcast signal is time division multiplexed based upon a heartbeat signal encoded into the common clock signal, and
the event broadcast signal propagates in both directions among the plurality of distributed network analyzers.

6. The apparatus of claim 5, wherein each distributed network analyzer comprises:
an input connector to receive a first time correlation signal, a first sample interval correlation signal, and a first event broadcast signal;
a correlation handler to:
extract a first clock signal from the first time correlation and a first heartbeat signal from the first sample interval correlation if the first time correlation and the first sample interval correlation are received, and
generate and encode a second clock signal into a second time correlation signal and a second heartbeat signal into a second sample interval correlation signal if the first time correlation signal and the first sample interval correlation signals are not received;
an event handler to:
extract a first event from the first event broadcast signal if the first event broadcast signal is received, and
generate and encode a second event signal into a second event broadcast if a second event is to be broadcast to the other distributed network analyzers that are downstream and if the second event is not extracted from the first event signal;
an Ethernet data handler to transmit and receive Ethernet data; and
an output connector to transmit the first or second time correlation signals, the first or second sample interval correlation signals, and the first or second event broadcast signals.

7. The apparatus of claim 6, further comprising a host controller or network analyzer coupled to the first of the plurality of distributed network analyzers via the Ethernet cabling, the host controller or network analyzer and the plurality of distributed network analyzers exchanging the Ethernet data via the Ethernet cabling.

8. The apparatus of claim 7, wherein the first and second correlation signals are transmitted on the first pair of the unused pairs of wires, the first and second event broadcast signals are transmitted on the second pair of the unused pairs of wires, and the Ethernet data signals are transmitted on other pairs of wires of the Ethernet cabling.

9. The apparatus of claim 7, wherein the network analyzer comprises a host controller and a distributed network analyzer.

10. The apparatus of claim 6, wherein the output connector includes a crossover wiring function.

11. An apparatus comprising:
an instrument structure having a means for providing a plurality of distributed network analyzers; and
Ethernet connecting means for daisy-chain connecting the distributed network analyzers, the Ethernet connecting means having unused pairs of wires, wherein
the plurality of distributed network analyzers are connected to one another through the Ethernet cabling means using the unused pairs of wires to perform time correlation by using a first pair of said unused pairs of wires to transmit both a common clock signal and a sample interval correlation signal that is synced to the common clock signal and shared among each of the connected plurality of distributed network analyzers, and
the plurality of distributed network analyzers use a second pair of said unused pairs of wires to transmit an event broadcasting signal,
the event broadcast signal is time division multiplexed based upon a heartbeat signal encoded into the common clock signal, and
the event broadcast signal propagates in both directions among the plurality of distributed network analyzers.

12. The apparatus of claim 11, wherein each distributed network analyzer comprises:
means for providing an input connector to receive a first time correlation, a first sample interval correlation, and a first event broadcast;
means for providing a correlation hander for:
extracting a first clock from the first time correlation and a first heartbeat from the first sample interval correlation if the first time correlation and the first sample interval correlation are received, and
generating and encoding a second clock into a second time correlation and a second heartbeat into a second sample interval correlation if the first time correlation and the first sample interval correlation are not received;
means for providing an event handler for:
extracting a first event from the first event broadcast if the first event broadcast is received, and
generating and encoding a second event into a second event broadcast if a second event is to be broadcast to the other distributed network analyzers that are downstream and if the second event is not extracted from the first event signal; and
means for providing an Ethernet data handler to transmit and receive Ethernet data; and
means for providing an output connector to transmit the first or second time correlation, the first or second sample interval correlation, and the first or second event broadcast.

13. The apparatus of claim 12, further comprising means for providing a host controller or network analyzer coupled to the first of the plurality of distributed network analyzers via the Ethernet connecting means, the host controller or network analyzer and the plurality of distributed network analyzers exchanging the Ethernet data via the Ethernet cabling.

14. The apparatus of claim 13, wherein the first and second correlations are transmitted on the first pair of the unused pairs of wires, the first and second event broadcasts are transmitted on the second pair of the unused pairs of wires, and the data is transmitted on other pairs of wires of the Ethernet connecting means.

15. The apparatus of claim 13, wherein the means for providing the network analyzer comprises a host controller and a distributed network analyzer.

16. The apparatus of claim 12, wherein the means for providing an output connector includes a crossover wiring function.

17. The apparatus according to claim 1, wherein the first and second distributed network analyzers are capable of bidirectional receipt and transmission over the unused pairs of wiring.

18. The apparatus according to claim 1, wherein the first and second distributed network analyzers are connected through the Ethernet cabling using crossover wiring to allow a direct Ethernet connection between the distributed network analyzers.

19. The apparatus according to claim 5, wherein the Ethernet cabling comprises pairs of twisted wiring.

20. The apparatus according to claim 11, wherein the Ethernet connecting means comprises pairs of twisted wiring.

* * * * *